(12) United States Patent
Martin et al.

(10) Patent No.: US 8,267,064 B2
(45) Date of Patent: Sep. 18, 2012

(54) ENGINE FUEL SUPPLY SYSTEM

(75) Inventors: Peter Martin, Essex (GB); Andrew Smith, Farleigh Hungerford (GB)

(73) Assignees: Flitch Limited, Essex (GB); G-Volution Limited, London (GB)

( * ) Notice: Subject to any disclaimer, the term of this patent is extended or adjusted under 35 U.S.C. 154(b) by 459 days.

(21) Appl. No.: 12/449,784

(22) PCT Filed: Feb. 27, 2008

(86) PCT No.: PCT/GB2008/000652
§ 371 (c)(1),
(2), (4) Date: Feb. 25, 2010

(87) PCT Pub. No.: WO2008/104764
PCT Pub. Date: Sep. 4, 2008

(65) Prior Publication Data
US 2010/0147262 A1    Jun. 17, 2010

(30) Foreign Application Priority Data
Feb. 28, 2007    (GB) .................................. 0703897.9

(51) Int. Cl.
| F02B 3/00 | (2006.01) |
| F02B 43/00 | (2006.01) |
| F02B 47/00 | (2006.01) |
| F02B 13/00 | (2006.01) |
| F02M 25/00 | (2006.01) |

(52) U.S. Cl. .......................... 123/299; 123/1 A; 123/575

(58) Field of Classification Search .................. 123/1 A, 123/299, 478, 525, 526, 575, 300, 304, 306, 123/527, 568.11, 576, 577, 578; 701/103
See application file for complete search history.

(56) References Cited

U.S. PATENT DOCUMENTS

| 5,379,740 A | * | 1/1995 | Moore et al. .................. 123/478 |
| 5,628,294 A | | 5/1997 | Krieckaert |
| 6,508,209 B1 | * | 1/2003 | Collier, Jr. ........................ 123/3 |

(Continued)

FOREIGN PATENT DOCUMENTS
DE        10146063 A1     4/2003
(Continued)

OTHER PUBLICATIONS

International Search Report from corresponding application PCT/GB2008/000652 mailed Jul. 17, 2008.

*Primary Examiner* — Stephen K Cronin
*Assistant Examiner* — Sizo Vilakazi
(74) *Attorney, Agent, or Firm* — Wolf, Greenfield & Sacks, P.C.

(57) ABSTRACT

Apparatus for controlling dual fuel supply to a fuel injected engine having an electronic engine management system (1) that supplies a primary injector control signal (8) to each of primary fuel injectors (2), the apparatus comprising an emulator (11) that emulates the electrical characteristics of a primary injector, a fuel control switch (10) that switches the primary injector control signal (8) from the primary injector (2) to the emulator (11) when an alternative mode is selected, a monitor (16) that monitors the primary injector control signal (8) to produce a monitor signal, and a controller (4) that processes the monitor signal to derive an alternative control signal which is used to control the primary fuel supply or a mixture of the primary fuel and a secondary fuel such as LPG, to the engine. Preferably the primary fuel supply is modulated by controlling injector control pulses. A secondary fuel may also be injected (3) and controlled by the controller (4).

16 Claims, 3 Drawing Sheets

U.S. PATENT DOCUMENTS

Figure 1:
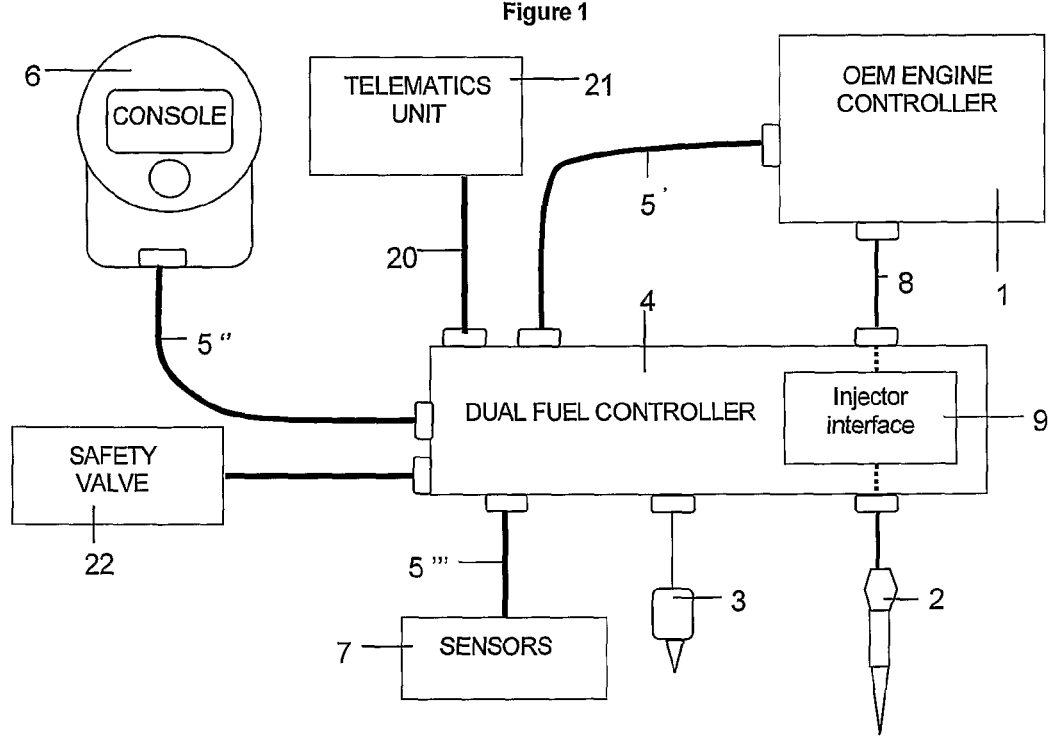

| | | | |
|---|---|---|---|
| 6,820,587 B1 * | 11/2004 | Hoglund et al. | 123/299 |
| 2002/0078919 A1 * | 6/2002 | Yasuoka et al. | 123/295 |
| 2003/0209211 A1 * | 11/2003 | Collier, Jr. | 123/1 A |
| 2005/0229872 A1 | 10/2005 | Lange | |
| 2010/0258076 A1 * | 10/2010 | Eismark et al. | 123/279 |
| 2011/0203544 A1 * | 8/2011 | Katou | 123/193.6 |

FOREIGN PATENT DOCUMENTS

| | | |
|---|---|---|
| DE | 10301299 A1 | 7/2003 |
| GB | 2372835 A | 9/2002 |
| WO | WO 92/08888 A | 5/1992 |
| WO | WO 2007/115594 A | 10/2007 |

* cited by examiner

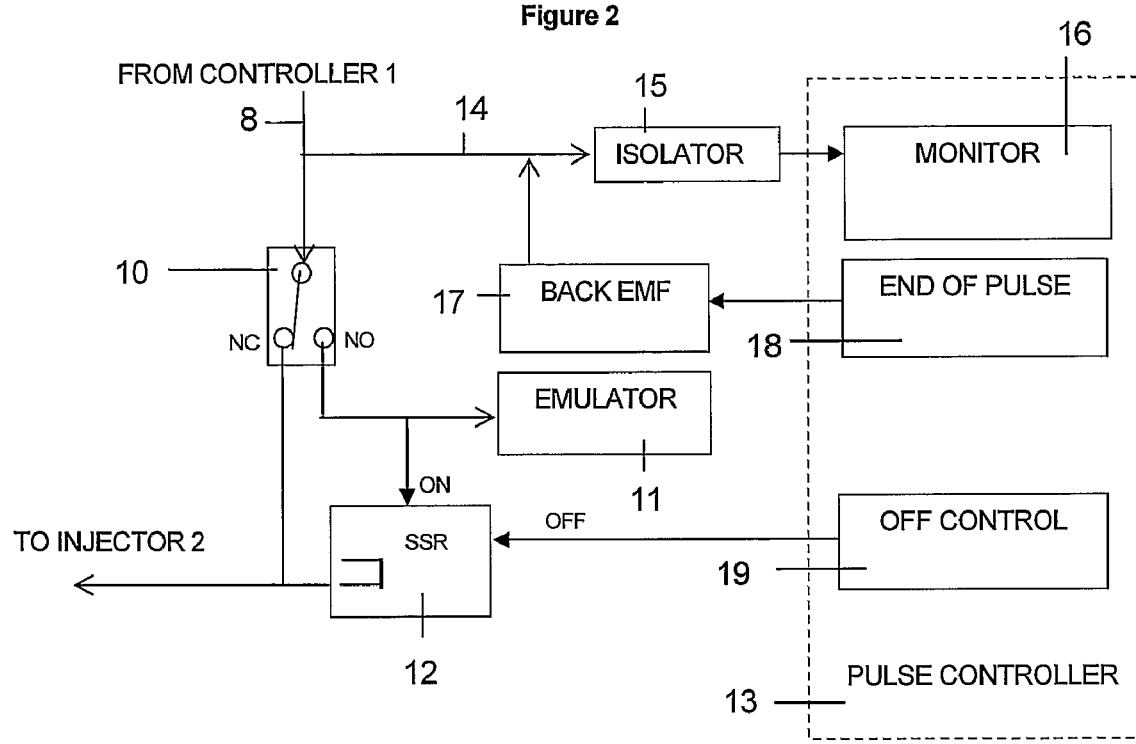

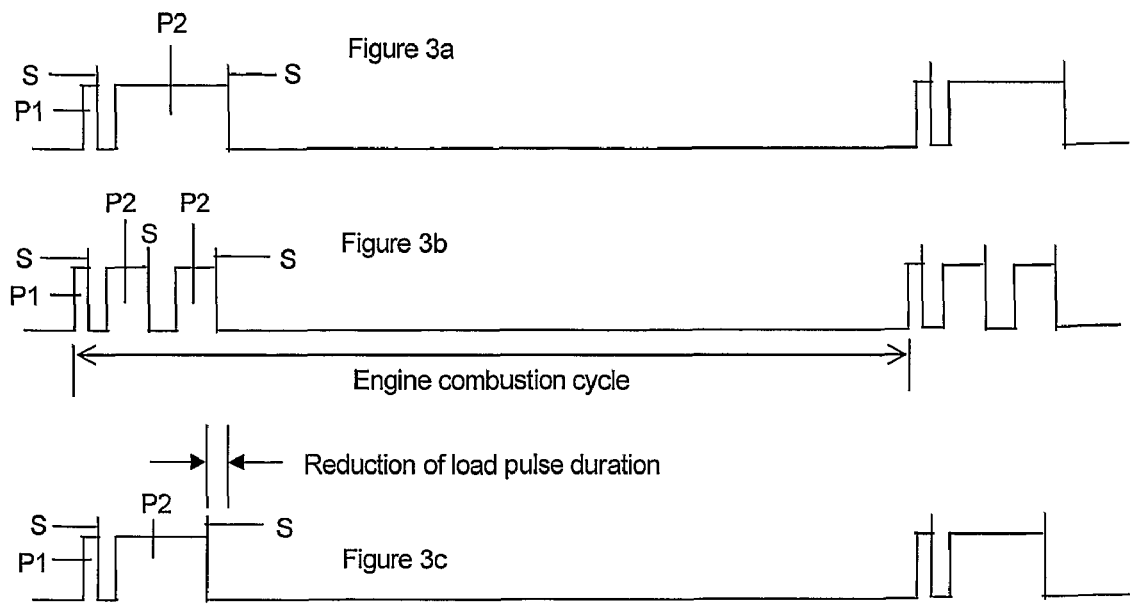

ENGINE FUEL SUPPLY SYSTEM

This invention relates to a method and apparatus for controlling the fuel supply to the injectors of a fuel injected engine having an electronic management system that applies an injector control signal to each injector.

LPG has been used as an alternative fuel in diesel engines for many years. Different dual fuel diesel/LPG kits have been designed for the HGV and light van market. Typical low cost systems use a fumigation system for introducing LPG vapour into the inlet manifold of the diesel engine. The increase in power and torque of the engine caused by the introduction of the LPG is detected by, and will cause, the original equipment manufacturer (OEM) engine controller, acting as a governor, to reduce the amount of primary diesel fuel being provided to the engine to reduce the torque and power of the engine back to within normal limits. This resultant reduction in primary fuel type therefore produces a net cost saving, assuming that the LPG is less costly. The simpler systems have no rate or flow control on the introduction of the gaseous LPG. More advanced systems use crude flow control for the gaseous LPG based on monitoring some of the engine sensors, such as the manifold absolute pressure (MAP) or revolutions per minute (RPM).

Further enhanced systems use electronic injector technology to introduce the LPG in either gaseous form or liquid form to the engine. The latter liquid systems can also use direct injection into the engine cylinder rather than into the inlet manifold of the engine.

Systems operating on the replacement principle (up to 50% use of alternative fuel) also exist, but these have poor hydrocarbon emissions performance.

The standard method of reducing or restricting the diesel or other primary fuel type to the engine in a controlled manner by the systems, is by remapping some of the control parameters of the OEM engine controller.

Patent GB2372835 discloses apparatus for controlling an alternative fuel supply such as LPG to a fuel injected engine. An electronic engine management system supplies an injector control signal to each injector to control a primary fuel such as diesel. An emulator is provided that emulates the electrical characteristics of an injector, and a switch switches the injector control signal from the injector to the emulator when the alternative fuel supply is selected. The monitor monitors the injector control signal to produce a monitor signal, and a controller processes the monitor signal to provide an alternative fuel control signal which is used to control the alternative fuel supply to the engine. The electronic engine management system therefore controls either the diesel or LPG supplied to the engine in each of the respective diesel or LPG modes of operation.

An object of the present invention is to provide an improved system for controlling dual fuel engines capable of operating on a mixture of fuels.

According to one aspect, the invention comprises apparatus for controlling fuel supply to a fuel injected engine having an electronic engine management system that supplies an injector control signal to each of primary fuel injectors, the apparatus comprising an emulator that emulates the electrical characteristics of an injector, a control switch that switches the primary injector control signal from the primary injector to the emulator when an alternative mode is selected, a monitor that monitors the primary injector control signal to produce a monitor signal, and a controller that processes the monitor signal to derive an alternative control signal which is used to control the primary fuel supply or a mixture of the primary fuel and a secondary fuel, to the engine.

The invention will now be described by way of example with reference to the accompanying drawings in which FIG. 1 shows a schematic drawing of apparatus for controlling fuel supply to a fuel injected engine according to the invention, FIG. 2 is a schematic drawing of components of the apparatus of FIG. 1 including a switch and controller according to the invention, FIG. 3 illustrates the injector pulses used to drive the injectors in the apparatus of FIG. 1 in different modes of operation.

A fuel control system according to the invention is illustrated in FIG. 1 comprising an engine controller 1, which may be of a known type, for controlling injection of a primary fuel such as diesel in an engine. The engine controller would typically comprise OEM equipment associated with the engine and the vehicle powered by the engine. A set of primary fuel injectors 2, is provided on the engine for primary fuel injection. One fuel injector 2 is provided for each cylinder of the engine, although only one is shown in FIG. 1. A secondary fuel system such as an LPG gas injection system is also provided to power the engine comprising a set of secondary fuel injectors 3, (usually one per cylinder, although only one is shown in FIG. 1). A dual fuel controller 4 is also provided to control the injection of the primary and secondary fuel for a dual fuel mode of the engine, and this has control inputs from the engine controller 1 and control outputs to the primary and secondary fuel injectors 2, 3. The controllers 1 and 4 between them form a hybrid fuel control system which can control the engine so that it is powered by either the primary fuel alone or a combination of the primary and secondary fuels.

The engine controller 1 and dual fuel controller 4 are connected, for example, by one or more CAN (Controller Area Network) connections 5' for the transmission of control signals. A console 6 is also connected, for example, by a CAN connection together with a number of discrete signal connections 5", to the dual fuel controller 4 so as to display the status and performance of the system including instantaneous and average fuel consumption to an operator of the engine or vehicle to which the engine is fitted. A number of sensors 7 are also connected to the dual fuel controller 4 via connections 5'''; their operation is described hereinafter. An interface 20 is provided for connection to an external telematics unit 21, preferably in the form of a CAN connection from the dual fuel controller 4 or the console 6. This connection 20 allows the dual fuel controller to communicate with the external telematics unit 21 to exchange data. Typically this data consists of the status and performance of the hybrid fuel control system including the instantaneous and average fuel consumption. The telematics unit may transmit vehicle location data, typically obtained from a global positioning system (GPS) receiver, to a remote operator or base station. This allows the position of the vehicle to be monitored in real time. Telematics systems are also commercially available which provide an external interface to allow the status of the vehicle and/or its load to also be remotely monitored.

Injector output connections 8 from the engine controller 1 are connected to the primary fuel injectors 2 via an interface 9 which is provided as part of the dual fuel controller 4. The interface 9 is shown in more detail in FIG. 2 and includes an electromechanical relay 10 having a normally-closed primary-fuel state as shown in FIG. 2, in which the output connections 8 are connected directly to the primary fuel injectors 2, and a normally-open dual-fuel state in which the output connections 8 are connected to an injector emulator 11 (described hereinafter) and a switch 12 which operates to provide modulated output control pulses to the primary fuel injectors 2 under the control of a pulse controller 13 for the dual fuel mode of the engine. The normally closed state applies to the relay 10 when the dual fuel controller is inactive or powered down.

The engine controller 1 preferably generates primary injector control pulses which each consist of a pilot pulse P1 followed by one or more load pulses P2 per injection cycle, as shown in FIG. 3. The pilot pulse generally provides timing for the combustion cycle, and the load pulses P2 provide the majority of the fuel for the power required. A multiple pulse injection cycle serves to improve engine efficiency and reduce noise and emissions. FIG. 3a shows a single load pulse P2 per cycle and FIG. 3b shows multiple load pulses P2 per cycle. The duration of a load pulse or the number of load pulses may be varied to suit the operational mode of the engine e.g. high load, low r.p.m. When the dual fuel controller 4 is set for operation in the primary-fuel mode, the e-m relay 10 is set to the normally-closed state and the primary injector control pulses are applied directly to the injectors 2 to control injection of the primary fuel. However, when the dual fuel controller 4 is set for operation in the dual fuel mode, the primary injector control pulses are modulated in accordance with the required mix of primary and secondary fuel before outputting modulated injector control pulses to the injectors 2.

Generally, the load pulses P2 (not the pilot pulses P1) are modulated, and modulation involves varying the duration of a load pulse or deleting one or more of multiple load pulses in a cycle. As shown in FIG. 3c, the duration of a single load pulse is reduced in the dual fuel mode as compared with the primary fuel mode. The leading edge of the load pulse serves to operate the switch 12, which preferably takes the form of a fast Solid State Relay SSR that will generate the leading edge of an output load pulse to the injectors 2 with minimum latency. The output load pulse is then terminated by an injector OFF control 19 in the pulse controller 13 at an appropriate time to reduce the duration of the output load pulse to give the required modulation ratio. The pulse controller 13 is programmed to vary the modulation ratio of the primary injector control pulses in conjunction with the generation of secondary fuel injector control pulses by the dual fuel controller 4 so that the combination of primary fuel injected by injectors 2 and secondary fuel injected by injectors 3 corresponds to the required fuel/power demand represented by the injector control pulses generated by the OEM engine controller 1. Operation of the secondary fuel injectors 3 is synchronised to that of the primary fuel injectors, preferably, using the pilot pulses P1 of the primary injector control pulses. The OEM engine controller 1 does not therefore have to be reprogrammed for dual fuel operation; it is the dual fuel controller 4 which is programmed for dual fuel control.

Selection of primary fuel mode or secondary fuel mode is made by the dual fuel controller under real time software control. A fault with the secondary fuel supply system or a failure of transient operational conditions to suit the dual fuel mode, will cause the system to switch back to the primary fuel mode. A solenoid operated safety valve 22 is operated to shut off the LPG fuel supply in the case of a fault condition.

The dual fuel controller 4 is also responsive to the inputs from the sensors 7 in the dual fuel mode. The sensors include the following:

An engine coolant temperature sensor is used to indicate when the normal engine operating temperature has been reached, and is used to trigger the dual fuel mode when it is enabled.

A cam sensor or crank sensor is used to independently verify the engine rpm so that the number of primary injector pulses per engine cycle can be automatically determined. This sensor is also used for timing the LPG fuel injection pulses with respect to the engine rotation, in particular, the timing relative to the position and stroke of the pistons.

A lambda sensor is provided to sense oxygen in the engine exhaust and thereby determines combustion conditions. It is a real time sensor used to control and maintain optimal combustion when operating in dual fuel mode. The lambda value provides the best indicator for optimal combustion, and can be used as the basis of a software control loop to select either low emissions or low fuel usage modes of operation.

An engine exhaust temperature sensor is used to control and maintain optimal combustion when operating in dual fuel mode. The maximum allowable engine exhaust temperature value also provides a safety signal to prevent engine damage in the case of engine or system malfunction.

An engine cylinder temperature sensor is used to control and maintain optimal combustion when operating in dual fuel mode. The maximum allowable temperature value also provides a safety signal to prevent engine damage in the case of engine system malfunction.

A manifold absolute pressure MAP sensor is used primarily for systems that utilise the injection of a secondary fuel in a gaseous state into the inlet manifold. The pressure differential between the manifold and the secondary fuel injector common rail will determine how much secondary fuel is supplied when the secondary injector is activated. The MAP value is used in the software control loop to adjust the secondary injector control signal to compensate for this effect so that the correct amount of secondary fuel is supplied. The MAP sensor can also be used for all implementations to provide an indication of engine loading.

The MAP sensor output could alternatively be used to control directly the common rail injection pressure of the secondary fuel supply. This potentially alleviates the need to change the secondary injector control signals durations in response to changes in manifold pressure. Operation could be direct via a proportional pressure switch, but would probably be via the dual fuel controller 4. A real time software control loop would be included, but this would be different to the main software control loop used for calculating the secondary injector control signals.

A primary Fuel Rail Pressure sensor is potentially required together with the primary fuel injector control signal to determine the amount of primary fuel injected per engine cycle.

An engine speed RPM sensor is provided for safety reasons.

It will be appreciated that some sensors 7 such as exhaust temperature sensors or engine cylinder temperature sensors may only be provided for calibration of the dual fuel controller 4 when it is first commissioned or serviced.

In order that the injector pulse control signals generated by the OEM engine controller 1 retain their implicit fuel/power demand information when the e-m relay 10 switches over to the normally-open dual-fuel state, the e-m relay 10 connects the output connection 8 of the engine controller 1 to the injector emulator 11, which takes the form of an electrical load that simulates the characteristics of the injectors 2. A tapping 14 taken from the output connection 8 via an isolator 15 allows the injector pulse control signals to be monitored, for example, in terms of duration and frequency by a monitoring circuit 16 within the pulse controller 13. Measurements made by the monitoring circuit 16 in the primary fuel mode are then used by the pulse controller 13 to determine the required duration of the modulated injector control pulses and to determine the characteristics of the secondary fuel control pulses.

The emulator 11 may comprise a passive electrical load and/or an active electrical load, and may be electronically configured and computer controlled. The controller 13 may also vary the load characteristics in real time, for example, to produce different loads depending upon whether the injectors are active or inactive. Also, the overlap period when switching between different ratios of the two fuels may be controlled by the controller 13.

As well as the injector pulses P1 and P2 that serve to control the basic performance of the engine, there may be other injector pulses generated by the OEM engine controller 1 which are used to perform torque measurements on the engine, and therefore allow individual injector calibration and also exhaust emission treatments involving diesel particulate filters, catalysts, and exhaust gas recirculation such as heating, purging or regeneration. The dual fuel controller 4 may need to reproduce these additional pulses as injector control pulses to the primary fuel injectors 2 when in the dual fuel control mode so as to maintain these additional functions. Also the dual fuel controller 4 will need to emulate the characteristics of these additional control pulses at the output connection 8 from the OEM engine controller 1.

It will be noted from FIG. 3 that the injector control signals incorporate voltage spikes 5 known as flyback spikes that are generated by mechanical movement of the injector mechanism with respect to the electronic injector actuator. In order that OEM engine controller 1 should experience the same electrical response at the output connection 8 when the e-m relay 10 switches over to the dual state mode, the dual fuel controller 4 incorporates a back EMF generator 17 which is triggered by an end of pulse sensor 18 in the pulse controller 13 so as to generate a voltage spike to emulate the flyback spikes at the end of each injector control pulse.

A dual fuel control system according to the invention, e.g. using LPG as the secondary fuel with diesel as the primary fuel, can operate in either of two basic modes of operation: replacement mode and catalyst mode.

The principle unwanted emissions from a diesel engine are particulates and nitrous oxides, which are generally related to combustion temperature. Particulates are generally related to the efficiency of combustion in the engine cylinder, and exhaust treatments are traditionally employed to reduce these.

LPG has similar chemical properties to petrol but has a simpler molecular structure. It has a slightly lower energy density but produces lower emissions. The principle unwanted emissions from a petrol or LPG engine are hydrocarbons and carbon monoxide; both are generally related to the efficiency of combustion in the engine cylinder. Exhaust catalysts are effective in reducing hydrocarbon and carbon monoxide emissions.

The introduction of LPG as an alternative fuel as a catalyst (5 to 15%) has been shown to reduce the combustion temperature. The introduction of LPG as an alternative fuel on an up to 50% replacement basis has been shown not to increase the combustion temperature. Therefore the nitrous oxide emissions are either improved or unaltered respectively when operating in either catalyst or replacement hybrid fuel modes.

The introduction of LPG as an alternative fuel has also been shown to improve the diesel combustion process resulting in lower particulate emissions, but increased hydrocarbon emission.

A diesel engine operating in hybrid fuel mode therefore exhibits emission characteristics of both petrol and diesel engines. The temperature of both the exhaust and the engine cylinder can be used to optimise the combustion process when operating a diesel engine in hybrid fuel mode, and an exhaust catalyst can be used to reduce the hydrocarbon emissions. A suitable exhaust lambda sensor 7 can be used to optimise the combustion process.

It will be appreciated that the primary fuel injectors 2 require high currents to operation them, and that the injector drive circuits mist be able to supply these high currents and also be protected against high voltage spikes and reverse polarity voltages that can be experienced when driving inductive actuators such as injectors. The SSR 12 meets these requirements and is equivalent to an electromagnetic relay which provides a connection in both directions. Alternative embodiments might comprise high side drive circuits (switching the positive power supply to the injector), or low side drive circuits (switching the negative (0V) power supply to the injector), which provide a connection in a single direction only. High and low side drivers could also be used in combination. Both of these types of drive circuits could be implemented using solid state components such as Field Effect Transistors (FETs).

Similar drive circuits (albeit with a lower current requirement) may be used for driving the secondary fuel injectors 3.

In yet another alternative embodiment of the invention, the modulation of the injector control pulses to the primary fuel injectors 2 may be achieved by allowing the primary injection control pulses to activate the primary fuel injectors directly to start fuel injection, and then the dual fuel controller 4 operates to take over driving of the primary fuel injectors so that they can be de-activated earlier as determined by the pulse controller 13.

In yet another alternative embodiment of the invention, the primary fuel supply is controlled by varying the fuel pump supply pressure, and this can be done instead of or as well as controlling the primary injector control signals. In diesel engines the common rail, or pump pressure is both monitored and controlled by the OEM controller as part of a closed loop control system. The primary fuel pressure is therefore held constant by the action of the control loop. However the OEM controller can select different fuel pressures to suit the operation of the engine. For example a lower fuel pressure may be required at idle in order for the OEM controller to use a multiple pulse primary injection strategy. Attenuation of the fuel pressure sensor output will by the action of a control loop cause, the fuel pressure to be increased. Conversely amplification of the fuel pressure sensor output will by the action of the control loop cause, the fuel pressure to be decreased. A primary fuel demand signal from the duel fuel controller 4 can therefore be introduced into this pressure control loop to control the primary fuel pressure either up or down.

In yet another embodiment of the invention, the dual fuel controller 4 is restricted in its operation so that it only controls the supply of primary fuel to the engine. The controller 4 then allows the control pulses supplied to the primary fuel injectors 2 after switch over of the relay 10 to the emulator 6 to be changed to a different form rather than just being modulated. For example, a single primary control pulse might be changed to multiple primary control pulses or the timing of the primary control pulses might be changed.

It will be appreciated that the invention is not limited to diesel and LPG fuels, but can be applied to petrol, aviation gas, ethanol, hydrogen, and other fuels.

In yet another embodiment of the invention, the controller 4 may control the supply of three or more fuels or combinations of fuels and fuel additives to the engine. For example, a gaseous co-combustant such as hydrogen or oxygen or nitrous oxide, may be injected into the air supply to the engine, or a co-combustant such as a liquid or slurry of solids in liquid suspension such as rare-earth metal slurry, may be injected into the fuel supply or directly into the engine cylinders. The co-combustant could function as an oxidant or catalyst or solvent or a fuel. A co-combustant, as well as augmenting the fuel supply in the dual fuel mode of operation (e.g. diesel and LPG or ethanol), could be used to augment the fuel supply in a primary/single fuel mode of operation (e.g. diesel operation).

The invention claimed is:

1. Apparatus for controlling fuel supply to a fuel injected engine having an electronic engine management system that supplies a primary injector control signal to each of primary fuel injectors, the apparatus comprising an emulator that emulates the electrical characteristics of a primary injector, a fuel control switch that switches the primary injector control signal from the primary injector to the emulator when an alternative mode is selected, a monitor that monitors the primary injector control signal to produce a monitor signal, and a controller that processes the monitor signal to derive an alternative control signal which is used to control the primary fuel supply or a mixture of the primary fuel and a secondary fuel, to the engine.

2. Apparatus as claimed in claim 1, in which the controller comprises a primary fuel modulator control which becomes operable when the fuel control switch switches the primary injector control signal to the emulator and which is adapted to transmit a modulated primary injector control signal to the primary fuel injector to modulate the injection of primary fuel in accordance with the alternative mode of operation of the engine.

3. Apparatus as claimed in claim 2, in which the modulator control comprises an injector control pulse generator which is triggered by the primary injector control signal to output the leading edge of a control pulse to the primary fuel injector.

4. Apparatus as claimed in claim 3, in which the injector control pulse generator terminates said output control pulse in accordance with a predetermined alternative mode of operation.

5. Apparatus as claimed in claim 4, in which the injector control pulse generator is triggered by the leading edge of a pulse of the primary injector control signal and is reset to terminate said output control pulse in accordance with said predetermined alternative mode of operation.

6. Apparatus as in claim 3, in which the injector control pulse generator is triggered by each of a sequence of multiple injector control pulses intended to operate a primary fuel injector multiple times during each injector cycle so as to output multiple control pulses to the primary fuel injector, and in which the injector control pulse generator determines the number of output control pulses per injection cycle to as to modulate the primary fuel injected.

7. Apparatus as claimed in claim 2, in which the modulator control comprises an injector control pulse generator which is triggered by the primary injector control signal to output a control pulse to the primary fuel injector to maintain operation of the primary fuel injector once operation is commenced by the primary injector control signal, and in which the injector control pulse generator terminates said output control pulse in accordance with a predetermined alternative mode of operation.

8. Apparatus as claimed in claim 1, in which a secondary fuel is injected into the engine by secondary injectors and the controller outputs secondary injector control signals to control injection of secondary fuel by the secondary injectors in accordance with a dual fuel mode of operation of the engine.

9. Apparatus as claimed in claim 8, in which injection of the secondary fuel is synchronised to injection of the primary fuel.

10. Apparatus as claimed in claim 9, in which synchronisation of injection of the primary and secondary fuels is achieved using pilot pulses of the injector control signals.

11. Apparatus as claimed in claim 1, in which the dual fuel controller has an input from one or more sensors to determine the supply of primary and secondary fuel to the engine, the sensors being selected from the following: an engine exhaust temperature sensor, an engine cylinder temperature sensor, an engine rotation sensor (frequency and/or angle), a fuel pressure sensor and a lambda sensor.

12. Apparatus as claimed in claim 1, in which the engine management system is connected in a bus with the dual fuel controller.

13. Apparatus as claimed in claim 1, which includes a user console to display to the user the status performance of the engine in the dual fuel mode of operation.

14. Apparatus as claimed in claim 1, in which the controller modulates the supply of primary or secondary fuel by varying the fuel pressure supply.

15. Apparatus as claimed in claim 1, comprising an interface for connection to a telematics unit in order to report the status and performance of the system to the telematics unit.

16. A method of controlling fuel supply to an engine adapted to run on a primary fuel or a combination of the primary fuel and a secondary fuel, the primary fuel being injected by one or more primary fuel injectors under the control of a primary injector control signal generated by an electronic engine management system, the method comprising providing an emulator to emulate the electrical characteristics of a primary fuel injector, a fuel control switch to switch the primary injector control signal from the primary injector to the emulator when an alternative mode is selected, a monitor to monitor the primary injector control signal to produce a monitor signal, and a controller to process the monitor signal to derive alternative control signals which are used to control supply of the primary or a mixture of primary and secondary fuels to the engine.

* * * * *